Dec. 31, 1940. T. JAMIESON-CRAIG 2,227,336
HYDRAULIC COUPLING AND TURBOTORQUE TRANSMITTER
Filed Jan. 10, 1940 3 Sheets-Sheet 1

Inventor
Thomas Jamieson-Craig.
By Williams, Bradbury,
McCabe & Hinkle
Attys

Dec. 31, 1940.  T. JAMIESON-CRAIG  2,227,336
HYDRAULIC COUPLING AND TURBOTORQUE TRANSMITTER
Filed Jan. 10, 1940  3 Sheets-Sheet 2

Inventor
Thomas Jamieson-Craig.
By Williams, Bradbury,
McCall & Hinkle
Attys.

Dec. 31, 1940. T. JAMIESON-CRAIG 2,227,336
HYDRAULIC COUPLING AND TURBOTORQUE TRANSMITTER
Filed Jan. 10, 1940 3 Sheets-Sheet 3

Inventor:
Thomas Jamieson-Craig
By Williams, Bradbury & Hinkle
Attys.

Patented Dec. 31, 1940

2,227,336

UNITED STATES PATENT OFFICE 2,227,336

HYDRAULIC COUPLING AND TURBOTORQUE TRANSMITTER

Thomas Jamieson-Craig, Johnstone, Scotland, assignor of one-half to Duncan Campbell, Glasgow, Scotland Application January 10, 1940, Serial No. 313,229
In Great Britain December 6, 1938

10 Claims. (Cl. 60—54)

This invention has reference to hydraulic couplings and turbotorque transmitters of the kind comprising a bladed centrifugal primary pump element or radial flow impeller and one or more bladed turbine elements in an enclosed working chamber containing the working liquid.

The invention consists in the provision, in the working circuit of the liquid, of a booster pump driven from the input shaft of the transmitter and arranged to boost up the liquid flow to the inlet of the primary pump element or impeller.

The invention is applicable to any of the known forms of hydraulic couplings or turbotorque transmitters in which the working liquid circulates in a closed working circuit and in which the primary pump element comprises a bladed outward radial flow impeller, and the invention may be carried into effect by providing a tubular conduit in front of the inlet of the impeller and by fitting a pump in the said tubular conduit, the front end of which opens into the working circuit. The pump may be driven by any suitable mechanism from the input shaft of the transmitter.

The invention is applicable, for example, to turbotorque transmitters or hydraulic couplings of the Föttinger type, by fitting the inlet of the impeller element with a tubular inlet conduit through which the liquid in the working circuit will flow in its passage to the impeller, and by providing a vane-wheel pump in the said tubular conduit, with mechanism for driving the pump from the input shaft. The said tubular conduit may rotate with the output shaft of the turbotorque transmitter.

The invention further consists in a hydraulic coupling or turbotorque transmitter comprising a bladed centrifugal radial flow primary pump element or radial flow impeller which is driven by the input shaft of the transmitter and discharges radially outwards into an outer rotary bladed turbine element which drives the output shaft of the transmitter and which discharges axially in opposite directions into the working chamber, so that the working liquid is divided and flows in opposite directions towards opposite ends of the working chamber, whence it is returned to the impeller by a pair of booster pumps driven from the input shaft of the transmitter. The working liquid thus circulates in two working circuits within the working chamber. The booster pumps are mounted in tubular inlet conduits leading into the primary pump element or impeller at each side thereof and are driven by any suitable mechanism from the input shaft, thereby to supercharge the impeller. The main impeller may comprise two rings of turbine blades side by side with a diaphragm between them extending radially inwards to separate the flow from the two booster pumps, so that each booster pump discharges into one ring of blades of the main impeller.

The turbine element or elements may be fixed within an outer rotatable shell or casing which encloses the working liquid and drives the output shaft.

The booster pump or each booster pump may be driven from the input shaft through increased-velocity-ratio gearing.

The accompanying drawings illustrate examples of hydraulic couplings or turbotorque transmitters according to the invention.

Figure 1:
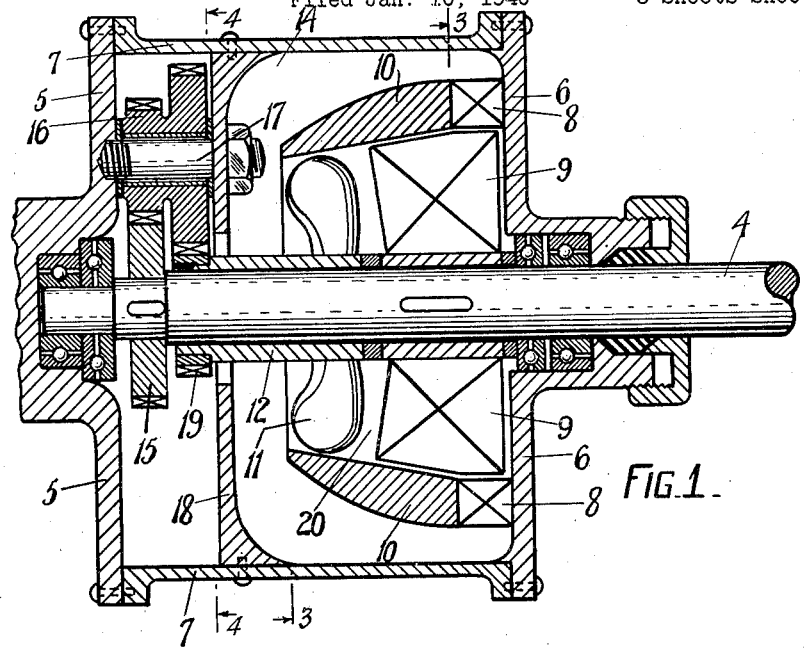
Fig. 1 is a sectional view in the plane of the shaft axis, showing apparatus having a single working circuit.
Figure 3:
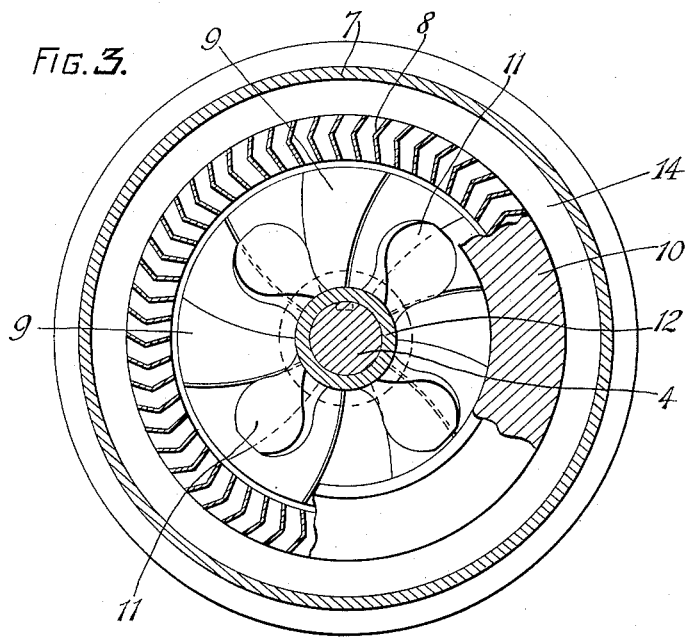
Fig. 3 is a view taken on the line 3—3 of Fig. 1 looking in the direction of the arrows and with parts broken away.
Figure 4:
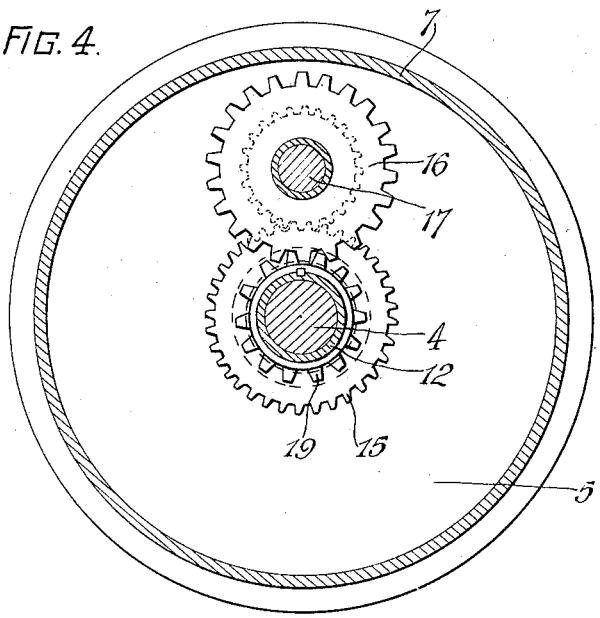
Fig. 4 is a sectional view taken on the line 4—4 of Fig. 1 looking in the direction of the arrows.

Referring firstly to Figs. 1 and 3, there is shown an input shaft 4 mounted in suitable bearings in end covers 5 and 6 of a shell or casing 7 so that the shell 7 with its end covers 5 and 6 is free to revolve upon the input shaft 4 which functions as the driving shaft and is free to rotate in the bearings in the end covers 5 and 6. Rotatable with the shell 7 is an annular bladed turbine element 8, which may be fixed to the end cover 6. Fixed upon the shaft 4 is a primary pump element or impeller 9 which is of the outward-radial-flow type and rotates within and discharges into the turbine element 8. The latter is mounted at the rear end of a hollow core 10 which turns with the turbine element 8 and consequently with the shell 7. The core 10 provides an inlet conduit 20 for the impeller 9. Mounted to freely revolve on the shaft 4 in front of the impeller 9 is a booster pump which may comprise vanes 11 on a hollow hub 12, the pump vanes 11 revolving inside the conduit 20 which opens at its front end into the chamber 14 enclosed by the shell 7 and its end covers 5 and 6. The chamber 14 is filled or nearly filled with a suitable working liquid, for example oil, and suitable joints and stuffing boxes are provided to prevent leakage of the working fluid from the chamber 14. The pump vanes 11 are rotated by mechanism driven from the shaft 4. As shown, a spur wheel 15 keyed to the shaft 4 meshes with a double spur wheel 16 mounted to rotate on a stud 17 carried between the end cover 5 and an inner ring or diaphragm 18 which is fixed to and rotates with the shell 7. The double spur wheel 16 drives a pinion 19 fixed to the hub 12 carrying the pump vanes 11. The diaphragm 18 may be shaped as shown and directs the working liquid from the circumference of the chamber 14 towards the front end of the conduit 20. The working liquid in the chamber 14 may be cooled in any known manner, such as by flowing a cooling medium in a jacket around the shell and end covers and/or through cooling passages in the shaft 4 and/or core 10, and/or through the gearing. The shell 7 or one of the end covers 5 and 6 drives a driven member in any known manner.

When the input shaft 4 is rotated and the shell 7 is under load, the gearing 15, 16 and 19 drives the pump vanes 11, thus supercharging the impeller 9. Preferably the gearing 15, 16 and 19 is designed to drive the pump vanes 11 at a greater speed than the shaft 4 drives the impeller 9. As the load accelerates, the rotation of the shell 7 reduces the velocity ratio of the gearing 15, 16, 19, thus decreasing the speed of rotation of the pump vanes 11 and the gearing may be designed so that, when the shell 7 is rotating at input shaft speed, the pump vanes 11 are rotated at the same speed.

Figure 2:
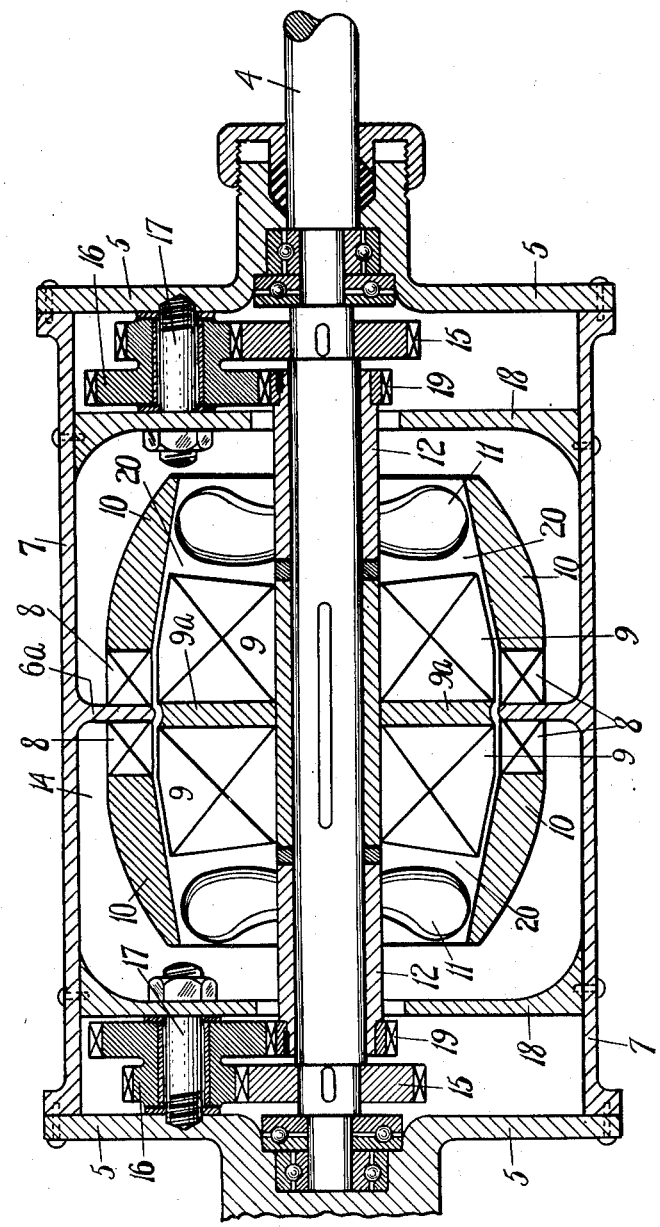
Fig. 2 is a similar sectional view showing apparatus in which there are two working circuits.

The arrangement shown in Fig. 2 is substantially a duplication of that shown in Fig. 1 and like parts are indicated by the same reference characters. In the construction shown in Fig. 2 a double-bladed impeller 9 has its two sets of blades separated by an intermediate flange or diaphragm 9a, but two separate impellers may be employed. A dividing ring 6a secured to the shell 7 separates the two turbine elements 8 which, together with the cores 10, are fixed to the shell 7. Any of the modifications described with reference to Fig. 1 may be applied to the construction shown in Fig. 2.

I claim:

1. A hydraulic coupling comprising an input shaft, a fluid-tight casing rotatably mounted on said shaft, a fluid enclosed in said casing, a radial-flow impeller in said casing and mounted to rotate with said shaft, a turbine element encircling said impeller and fixed to said casing, a booster pump arranged to deliver fluid to said impeller, said booster pump being mounted on said input shaft and adapted to rotate independently thereof, mechanical gearing for driving said pump from said shaft at a velocity greater than that of said impeller during acceleration of said casing to input shaft speed, and means in said casing for directing the fluid discharged by the turbine element to the suction side of said pump.

2. A hydraulic coupling comprising an input shaft, a fluid-tight casing rotatably mounted on said shaft, a fluid enclosed in said casing, a radial-flow impeller in said casing and mounted to rotate with said shaft, a turbine element encircling said impeller and fixed to said casing, a booster pump arranged to deliver fluid to said impeller, said booster pump being mounted on said input shaft and adapted to rotate independently thereof, mechanical gearing for driving said pump from said shaft at a velocity greater than that of said impeller during acceleration of said casing to input shaft speed, a conduit surrounding said pump and open at one end to the impeller and at its other end to the interior of the casing, and means in said casing whereby the fluid discharged by the turbine element is directed into said conduit.

3. A hydraulic coupling comprising a main impeller having two rings of radial-flow blades side by side separated by a radial diaphragm, a pair of booster pumps one at each side of said impeller and discharging thereinto, said booster pumps being mounted on said input shaft and adapted to rotate independently thereof, a rotary bladed turbine element having two rings of blades respectively encircling the two rings of blades of the impeller, an enclosing casing charged with liquid and having a radial diaphragm dividing the flow from said turbine element towards opposite ends of said casing, a pair of conduits one encircling each booster pump, each conduit being open at one end to the impeller and at the other end to the interior of said casing, means for rotating said impeller, and means for rotating said booster pumps at a velocity greater than that of said impeller during acceleration of the driven element of said coupling to driving speed.

4. Power transmitting mechanism comprising an input member, a rotary impeller driven by said input member, a turbine wheel, an output member driven by said turbine wheel, a casing enclosing said impeller and turbine wheel and containing a working fluid to which a cyclic flow is imparted by said impeller and turbine wheel, a fluid impelled into said turbine wheel by said impeller returning in said casing from the discharge side of said turbine wheel to the entrance to the impeller, and means for accelerating the cyclic flow of the working fluid during acceleration of said output member, said means comprising a rotary pump rotatable about an axis co-axial with the axis of the impeller, and gearing operating at increased velocity ratio during such acceleration of said output member for positively driving said pump from said input member.

5. Power transmitting mechanism comprising an input member, a rotary impeller driven by said input member, a turbine wheel, an output member driven by said turbine wheel, a casing enclosing said impeller and turbine wheel and containing a working fluid to which a cyclic flow is imparted by said impeller and turbine wheel, the fluid impelled into said turbine wheel by said impeller returning in said casing from the discharge side of said turbine wheel to the entrance to the impeller, and means for accelerating the cyclic flow of the working fluid comprising a rotary pump rotatable about an axis co-axial with the axis of the impeller, an epicyclic gearing for positively driving said pump from said input member, said epicyclic gearing including planetary gears rotatable with the output member, whereby the speed ratio between the rotary pump and the impeller decreases as the speed of the output member increases relatively to the speed of the input member.

6. A hydraulic coupling or power transmitter comprising an input shaft, a bladed centrifugal primary pump element driven by said shaft, an inlet conduit co-axial with and at the inlet side of said element, a rotary pump in said conduit, gearing operating at variable velocity ratio when the coupling elements are rotating at different speeds, said gearing driving said pump from said shaft, a bladed turbine element into which said pump element discharges, said inlet conduit rotating with said turbine element, an enclosing casing forming a working chamber for fluid circulated by said pump, pump element and turbine element, said working chamber returning the circulating fluid to the suction side of the pump, an output shaft, and means for driving said output shaft from the turbine element.

7. A hydraulic coupling comprising an impeller shaft, an impeller mounted to rotate with said shaft and having an inlet mouth concentric with the axis of said shaft, a rotary pump having its rotor rotatable about the axis of said impeller and arranged to deliver to the inlet mouth of said impeller, means operatively connecting the impeller shaft to the pump rotor for positively rotating said rotor at a speed in excess of the impeller speed under accelerating load rotation, a turbine element into which said impeller discharges, and a casing enclosing said impeller, pump and turbine element, and enclosing a fluid, said casing being adapted to return the fluid from the turbine element to the pump.

8. A hydraulic coupling comprising a driving member, a radial flow impeller rotated by said member, a turbine element encircling said impeller, an open-ended inlet conduit co-axial with said impeller with an opening at one end towards the center of said impeller, a rotary pump in said conduit, the rotor of said pump being rotatable about the axis of said impeller, planetary gearing for positively rotating the pump rotor in a direction to discharge towards the impeller, the starting velocity of said pump rotor being greater than the starting velocity of said impeller, and a casing enclosing said turbine element, impeller and conduit and enclosing a fluid, said casing being adapted to return the fluid from the turbine element to the open end of the conduit remote from the impeller.

9. A hydraulic coupling comprising an input shaft, an impeller mounted on and driven by said shaft, a fluid-tight casing rotating about the axis of said shaft, a turbine element mounted in and attached to said casing, an inlet conduit conducting fluid to said impeller, a booster pump mounted on said input shaft, and gearing between said casing, booster pump and drive shaft adapted to drive said booster pump at a starting high velocity relative to the velocity of said impeller, the ratio of velocities between said booster pump and said impeller being reduced as the velocity of the casing is increased, said casing being formed with passages to return the fluid from the turbine element to said inlet conduit.

10. A hydraulic coupling comprising an input shaft, an impeller element mounted on and driven by said shaft, a driven casing, a turbine element mounted in and attached to said casing, an inlet conduit conducting fluid to said impeller, a booster pump mounted in said conduit, said booster pump being driven by said input shaft through planetary gearing, mounted in said casing at a high velocity when said casing is rotating at low velocity, and the ratio of velocities between said booster pump and said casing being reduced as the velocity of said casing increases over the starting velocity, said casing being formed to return fluid from the turbine element to said inlet conduit for the impeller.

THOMAS JAMIESON-CRAIG.